United States Patent [19]

Goosey, Jr. et al.

[11] Patent Number: 4,991,946
[45] Date of Patent: Feb. 12, 1991

[54] FINITE CONJUGATE PROJECTION LENS SYSTEM

[75] Inventors: William T. Goosey, Jr., Fairport; Lee R. Estelle, Rochester, both of N.Y.

[73] Assignee: Eastman Kodak Company, Rochester, N.Y.

[21] Appl. No.: 396,397

[22] Filed: Aug. 21, 1989

[51] Int. Cl.$^5$ .................... G02B 9/40; G02B 9/50; G02B 9/54
[52] U.S. Cl. .................................................. 350/471
[58] Field of Search ................................. 350/471, 470

[56] References Cited

U.S. PATENT DOCUMENTS

| | | | |
|---|---|---|---|
| 2,171,640 | 9/1939 | Berek | 350/471 |
| 2,926,564 | 3/1960 | Mukai | 350/471 |
| 3,023,671 | 3/1962 | Mukai | 350/471 |
| 3,815,974 | 6/1974 | Momiyama | 350/217 |
| 4,426,137 | 1/1984 | Mori | 350/471 |
| 4,671,627 | 6/1987 | Shinohara | 350/471 |
| 4,773,746 | 9/1988 | Arai | 350/466 |
| 4,784,480 | 11/1988 | Yokota et al. | 350/471 |

Primary Examiner—Scott J. Sugarman
Attorney, Agent, or Firm—Svetlana Z. Short

[57] ABSTRACT

A disclosed lens system is an atypical Gaussian-type lens comprised of two lens groups located at opposite sides of an aperture stop. Each of the groups is comprised of a doublet and a singlet. The doublets and singlets are located in sequential asymmetry with respect to the aperture stop. The front group has a cemented doublet as its foremost object-side lens component. This doublet consists of a lens element of negative power followed by a lens element of a positive power.

10 Claims, 1 Drawing Sheet

4,991,946

FINITE CONJUGATE PROJECTION LENS SYSTEM

BACKGROUND OF THE INVENTION

1. Field of the Invention

The present invention relates to lenses which are suitable for use as a finite conjugate projection lens system, and, more particularly, to a small-size, high-performance, wide-angle reader-printer lens for use in a facsimile machine, an image scanner, a microfilm machine, etc.

In order to attain a high resolution of the order of 7 to 10 µm on the image side, lenses used in facsimile machines, image scanners, microfilm machines, etc., are required to provide a high contrast ratio at high spatial frequencies. In addition, such lenses must have very little or no vignetting in order to minimize the decrease in the quantity of marginal light. It is also necessary to compensate various aberrations to a satisfactorily small level.

In order to meet all of these requirements, Gaussian-type lenses have been traditionally employed for these applications. Examples of such lenses are disclosed in U.S. Pat. Nos. 4,784,480 and 4,426,137. A typical Gaussian-type lens system is composed of two groups wherein one group is located preceding the stop and the other group is located behind the stop. Each group has two sub-groups (inner and outer) and the entire lens usually contains 6 to 8 lens elements. Typical Gaussian-type lenses have two doublets or a doublet and a singlet in each group and are symmetrical with respect to the sequence of the doublets and singlets about an aperture stop and also in terms of the signs of the powers of the lens elements. For example, this lens type often has a positive lens element as a first or outer sub-group of the front group, and a cemented doublet as a second or inner sub-group of the first group. Because the most typical type of Gaussian-type lenses is generally symmetrical about an aperture stop, the first or inner sub-group of the rear group is usually also a cemented doublet. The second or outer sub-group of the rear group typically comprises one positive lens element. Sometimes the second doublet is uncemented to improve the lens performance, but this results in greater sensitivity to tolerance errors. Sometimes more than one lens element follows the second doublet. For example, the last positive lens element may be split into two or more single lens elements, or may be converted into a cemented doublet, resulting in a better performance at the expense of having more lens elements. Examples of such lenses are described in U.S. Pat. Nos. 4,773,746 and 3,815,974.

The typical Gaussian-type lens system has a large amount of comatic flare at middle-angle positions and very large amount of oblique spherical aberration at the maximum angles. In addition, a major problem with using the conventional Gaussian type lens such as disclosed in U.S. Pat. No. 4,784,480 in a reader printer is that small changes in the element thicknesses of the first doublet produces relatively large changes in image distance and field curvature. Because magnification as well as object-to-image distance are fixed with little or no adjustment tolerance in most microfilm reader printers, this image distance sensitivity causes the first doublet of a conventional design to have either very tight tolerances on the thicknesses of both elements or the thicknesses of both elements comprising the first doublet must be "matched" so that the total thickness of the doublet is held to tight tolerances. Also, typical Gaussian-type lenses tend to suffer from a large amount of inward field curvature, causing additional image quality deterioration.

U.S. Pat. No. 4,671,627 discloses a two-group lens configuration of the same general type described above that has an overall symmetrical shape with respect to a diaphragm but which contains 8 lens elements.

U.S. Pat. No. 2,171,640 discloses an atypical variation of the Gaussian type lens which can be characterized in terms of its elements as $(+-)-$ stop $(-+)+$ configuration. For analysis purposes, the disclosed embodiment of this lens was scaled to have the same magnification, object-to-image distance, coverage and an F-number as one of the illustrative embodiments of the present invention. The analysis showed that this prior art lens has an unacceptable amount of astigmatism at the field coverage achievable by lenses according to our invention. In addition, this prior art lens suffered from much larger amount of vignetting than that of the present invention.

SUMMARY OF THE INVENTION

An object of the present invention is to provide a small-size, high-performance reader-printer lens projection system which has a relatively flat field.

Another object of this invention is to provide a microfilmer lens that has high resolving power and that is relatively insensitive to thickness changes and that at the same time has relatively few lens elements.

In the present invention, as taught by the above-cited U.S. Pat. No. 2,171,640, we depart from typical symmetry about an aperture stop in the sense of signs of the power of elements of the sub-groups involved, and also in the sense of the sequence of doublets and singlets. However, in addition, the foremost lens element has negative power. For example, the lens of U.S. Pat. No. 2,171,640 can be characterized in terms of elements as $(+-)-$ stop $(-+)+$, whereas a representative lens according to the present invention might be characterized in the same way as $(-+)-$ stop $(-+)+$. Because the first lens component is a doublet composed of a negative lens element followed by a positive lens element, not only is the color corrected, but, more importantly, the field curvature is less inward curving and the astigmatism is reduced. Hence, the general image quality throughout the field is enhanced.

BRIEF DESCRIPTION OF THE DRAWINGS

The accompanying drawings, which are incorporated in and constitute a part of the specification, illustrate embodiments of the invention, and together with the description, serve to explain principles of the invention.

DETAILED DESCRIPTION OF THE PREFERRED EMBODIMENT

Figure 1:
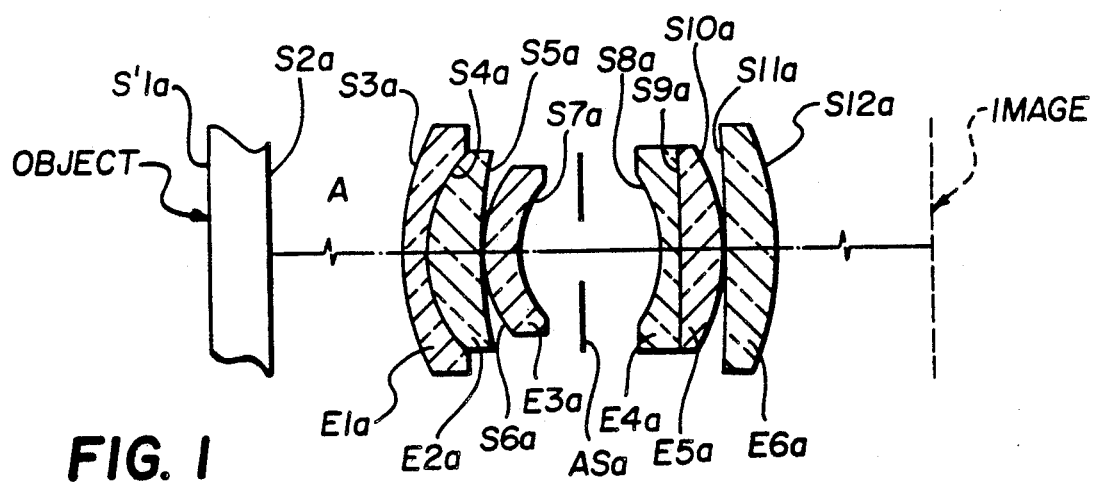
FIG. 1 is a schematic representation of a lens system according to the first illustrative embodiment of the present invention.

The following illustrative embodiment of the present invention shown in FIG. 1 is a lens system comprised of lens elements or lens components disposed in sequential asymmetry relative to the aperture stop location. In order from the object side, the illustrative lens comprises a first lens element ($E_{1a}$) which is a negative meniscus lens element having its convex surface directed toward the object side, a second lens element ($E_{2a}$) which is a positive meniscus lens element having its convex surface directed toward the object side, a third lens element ($E_{3a}$) which is a negative meniscus lens element having its convex surface directed toward the object side, an aperture stop ($AS_a$), a fourth lens element ($E_{4a}$) which is a negative meniscus lens element having its concave surface directed toward the object side, a fifth lens element ($E_{5a}$) having its concave surface directed toward the object side and a sixth lens element ($E_{6a}$) which is positive. The first and second lens elements ($E_{1a}$ and $E_{2a}$) are cemented and so are the fourth and fifth ($E_{4a}$ and $E_{5a}$) lens elements to make the overall system a four-component six-element lens configuration, wherein a component consists of one or more lens elements. Because the first subgroup of the front group is a cemented doublet, the sensitivity of both the tangential field and the image distance to changes in the thickness of the elements in a cemented doublet is significantly reduced when this lens is compared to a typical Gaussian lens. Data for this illustrative embodiment is given below in Table 1.

TABLE 1

| SURFACE | RADIUS | THICK-NESS | REFRACTIVE INDEX | Abbe V NUMBER |
|---|---|---|---|---|
| S1a | PLANO | 4.762 | 1.523 | 58.8 |
| S2a | PLANO | A | | |
| S3a | 19.6416 | 1.860 | 1.648 | 33.9 |
| S4a | 10.6482 | 4.500 | 1.713 | 53.8 |
| S5a | 38.6019 | 0.200 | | |
| S6a | 10.1979 | 2.660 | 1.755 | 27.6 |
| S7a | 7.7827 | 4.662 | | |
| | DIAPHRAGM | 6.145 | | |
| S8a | −10.3662 | 1.650 | 1.625 | 35.6 |
| S9a | −108.480 | 3.210 | 1.713 | 53.8 |
| S10a | −15.1402 | 0.200 | | |
| S11a | −207.643 | 3.875 | 1.734 | 51.7 |
| S12a | −25.5152 | | | | where A = 998.044 when 1/magnification = 24.823 and half angle coverage = 20.3°
A = 1018.243 when 1/magnification = 25.332 and half angle coverage = 19.94°

Table 1 shows numerical data of the first illustrative embodiment of the present invention. The first illustrative embodiment has a half-field angle of 20.3 to 19.94 degrees for magnification variance of 1/24.82× and 1/25.33×, with an effective focal length of about 39.59. The change in magnification is achieved by variation of space A, between a plano plate and the front of the foremost element ($E_{1a}$) with optical power. There is no vignetting, and the relative illumination is 76% at the maximum obliquity. This configuration results in a 20% to 40% modulation at 150 line pairs per mm.

Figure 2:
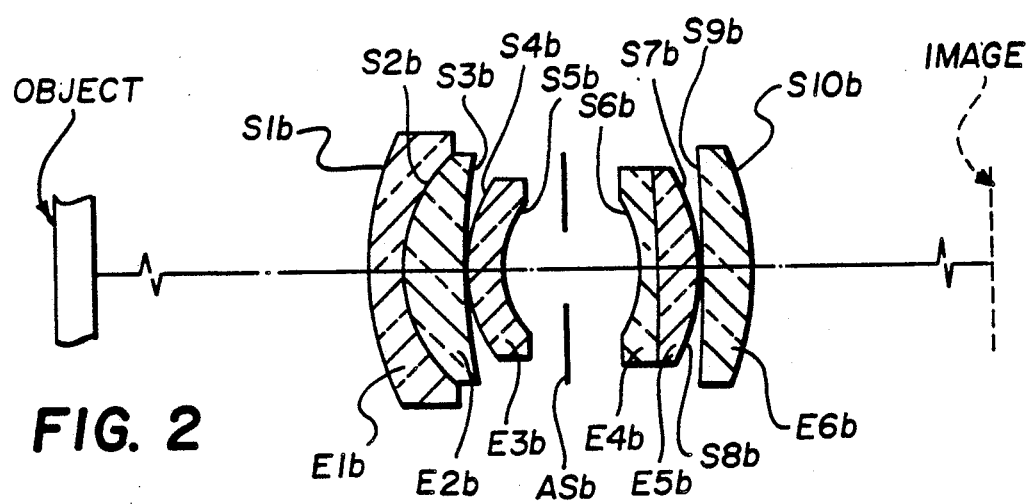
FIG. 2 is a schematic representation of a second illustrative embodiment of the present invention.

FIG. 2 illustrates a second embodiment of the present invention, which is generally similar in construction to the first embodiment described above and illustrated in FIG. 1. In FIG. 2, the six optical elements are given the same reference letters as those of FIG. 1, but with suffix "b" instead of "a". Table 2 below gives the values for the various parameters.

TABLE 2

| SURFACE | RADIUS | THICK-NESS | REFRACTIVE INDEX | Abbe V NUMBER |
|---|---|---|---|---|
| S1b | 16.0838 | 2.244 | 1.648 | 33.9 |
| S2b | 8.49960 | 3.858 | 1.713 | 53.8 |
| S3b | 29.7291 | 0.100 | | |
| S4b | 8.4996 | 2.186 | 1.620 | 36.4 |
| S5b | 6.4240 | 3.911 | | |
| | DIAPHRAGM | 4.483 | | |
| S6b | −7.91850 | 1.092 | 1.625 | 35.6 |
| S7b | −99.5818 | 2.630 | 1.713 | 53.8 |
| S8b | −11.9576 | 0.100 | | |
| S9b | −111.548 | 3.164 | 1.734 | 51.7 |
| S10b | −18.9943 | | | |

Table 2 shows data of the second illustrative embodiment of the present invention. The lens system in the second embodiment is constructed from six lens elements $E_{1b}$ through $E_{6b}$. However, the second embodiment does not have a plane parallel plate in front of the foremost lens element ($E_{1b}$). The second illustrative embodiment of the present invention has a half-field angle of 20°, the effective focal length of 33 mm., and an F-number of 5.6.

Figure 3:
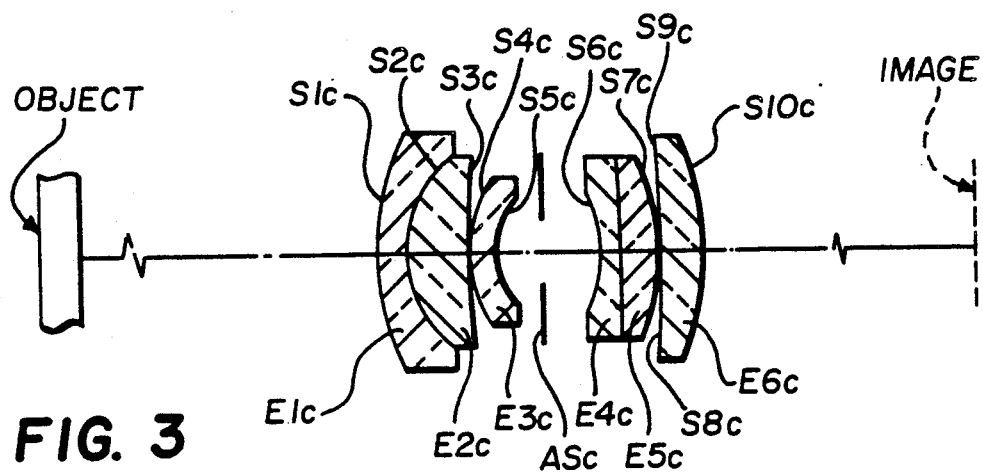
FIG. 3 is a schematic representation of a third illustrative embodiment of the present invention.

FIG. 3 illustrates a third embodiment of the present invention, which is similar in construction to the second embodiment described above and illustrated in FIG. 2. In FIG. 3, the six optical elements are given the same reference letters as those of FIG. 2, but with suffix "c" instead of "b". Because the third illustrative embodiment, just like a second illustrative embodiment, does not have a plane parallel plate in front of the foremost optical element ($E_{1c}$), the same reference letters are used for identification of various surfaces, as in the second embodiment, but with a "c" suffix. Table 3 below gives the values for the various parameters.

TABLE 3

| SURFACE | RADIUS | THICK-NESS | REFRACRIVE INDEX | Abbe V NUMBER |
|---|---|---|---|---|
| S1c | 12.5174 | 1.582 | 1.648 | 33.9 |
| S2c | 6.38860 | 2.991 | 1.713 | 53.8 |
| S3c | 24.7777 | 0.100 | | |
| S4c | 5.92150 | 1.639 | 1.620 | 36.4 |
| S5c | 4.49644 | 2.293 | | |
| | DIAPHRAGM | 2.902 | | |
| S6c | −7.44050 | 1.017 | 1.625 | 35.6 |
| S7c | 146.044 | 1.978 | 1.713 | 53.8 |
| S8c | −12.9945 | 0.100 | | |
| S9c | −111.548 | 2.387 | 1.734 | 51.7 |
| S10c | −13.4750 | | | |

Table 3 shows numerical data of the third illustrative embodiment of the present invention. This embodiment is very similar to the second embodiment, except for the differences shown in Table 3. The third illustrative embodiment of the present invention has a half-field angle of 22.73°, the effective focal length of 24.35 mm. and an F-number of 5.6.

While in the above embodiments, the first and third lens components are comprised of cemented doublets, it is, of course, possible to separate the cemented surfaces of either of the above two components.

The present invention is not limited to the aforesaid illustrative embodiments, but could be, of course, variously modified within the technical scope of the present invention.

While in the embodiments specifically described above all of the surfaces are spherical, it is to be understood that other embodiments of this invention may have nonspherical surfaces.

Similarly, it should be understood that the focal lengths and other system parameters of the illustrative embodiments can be scaled up or down for different applications. It should also be understood that the lens of the present invention can be turned around. For example it can form a +(+ −) stop −(+ −) configuration, with a cemented doublet as a last component, and a negative lens element as a rear lens element of the cemented doublet component.

The two group lens according to the present invention is not restricted to reader printer lenses, but could be usable in other applications, such as a copying lens. Similarly, it is not restricted to finite conjugate lenses, but could be adapted for use in other applications, such as a camera objective lens. It should be understood that principles of this invention apply to zoom lenses that have one or more moving elements or components. That is, it is possible to independently move sub-groups of the present invention to achieve a zoom lens. It is also possible to axially move the lens of the present invention in order to achieve other magnifications and to add one or more focusing components in the front or rear space to achieve a constant object-to-image distance.

The invention has been described in detail with particular reference to a presently preferred embodiment, but it will be understood that variations and modifications can be effected within the spirit and scope of the invention.

What is claimed is:

1. A Gaussian-type lens with an overall sequential asymmetry with respect to a sequence of the doublets and singlets about an aperture stop and also in terms of the signs of the powers of the lens elements, said lens comprising, from an object side, a cemented doublet lens component including a negative lens element and a positive meniscus lens element, a negative meniscus lens component, a cemented doublet lens component including a negative lens element and a positive lens element, and a positive meniscus lens component.

2. A Gaussian-type lens according to claim 1, wherein said negative lens elements in said first and third lens components are both meniscus.

3. An atypical Gaussian-type lens with an overall sequential asymmetry with respect to a sequence of the doublets and singlets about an aperture stop and also in terms of the signs of the powers of the lens elements, said lens comprising, from an object side, a meniscus cemented positive doublet lens component, a negative meniscus lens element, an aperture stop, a meniscus cemented negative doublet lens component, and a positive meniscus lens element, those lens surfaces adjacent to said aperture stop being concave and the foremost and rearmost lens surfaces being convex.

4. An atypical Gaussian-type lens according to claim 3 wherein said meniscus cemented positive doublet lens component consists of a front, negative meniscus lens element and a rear, positive meniscus lens element.

5. A Gaussian-type lens according to claim 3, wherein said meniscus cemented negative doublet lens component consists of a front, negative meniscus lens element and a rear, positive meniscus lens element.

6. A Gaussian-type lens according to claim 4, wherein the V-number of said front, negative meniscus lens elements is smaller than the V-number of said rear, positive lens element.

7. A lens system with an overall sequential asymmetry with respect to a sequence of the doublets and singlets about an aperture stop and also in terms of the signs of the powers of the lens elements comprising, in order from the object side: a first lens element which is a negative meniscus lens element having a convex object-side surface; a second element which is a positive meniscus lens element having a convex object-side surface, said second element being cemented to said first element; a third, negative meniscus lens element having a convex object-side surface; an aperture stop; a fourth, negative meniscus lens element having a concave object-side surface; a fifth, positive meniscus lens element having a concave object-side surface, said fifth element being cemented to said fourth element; and, a sixth, positive meniscus lens element.

8. A lens system according to claim 7, wherein said first and second lens elements form a positive cemented lens component.

9. A lens system according to claim 7, wherein said fourth and fifth lens elements form a negative cemented lens component.

10. A lens system described according to claim 7, wherein numerical data are as follows:

| SURFACE | RADIUS | THICK-NESS | REFRACTIVE INDEX | Abbe V NUMBER |
|---|---|---|---|---|
| S1 | PLANO | 4.762 | 1.523 | 58.8 |
| S2 | PLANO | A | | |
| S3 | 19.642 | 1.860 | 1.648 | 33.9 |
| S4 | 10.648 | 4.500 | 1.713 | 53.8 |
| S5 | 38.602 | 0.200 | | |
| S6 | 10.198 | 2.660 | 1.755 | 27.6 |
| S7 | 7.783 | 4.662 | | |
| | DIAPHRAGM | 6.145 | | |
| S8 | −10.366 | 1.650 | 1.625 | 35.6 |
| S9 | −108.480 | 3.210 | 1.713 | 53.8 |
| S10 | −15.140 | 0.200 | | |
| S11 | −207.643 | 3.875 | 1.734 | 51.7 |
| S12 | −25.515 | | | | where A = 998.044 when 1/magnification = 24.823 and half angle coverage = 20.3°
A = 1018.243 when 1/magnification =0 25.332 and half angle coverage = 19.94°.

where A=998.044 when 1/magnification=24.823 and half angle coverage=20.3°
A=1018.243 when 1/magnification=25.332 and half angle coverage=19.94°.

* * * * *